United States Patent
Hosek et al.

(10) Patent No.: US 10,058,996 B2
(45) Date of Patent: Aug. 28, 2018

(54) ROBOT ADAPTIVE PLACEMENT SYSTEM WITH END-EFFECTOR POSITION ESTIMATION

(71) Applicant: Persimmon Technologies, Corp., Wakefield, MA (US)

(72) Inventors: Martin Hosek, Lowell, MA (US); Jacob Lipcon, Arlington, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 0 days.

(21) Appl. No.: 14/944,603

(22) Filed: Nov. 18, 2015

(65) Prior Publication Data
US 2016/0136812 A1    May 19, 2016

Related U.S. Application Data

(60) Provisional application No. 62/081,209, filed on Nov. 18, 2014.

(51) Int. Cl.
| | | |
|---|---|---|
| *B25J 9/00* | (2006.01) | |
| *B25J 9/16* | (2006.01) | |
| *B25J 9/10* | (2006.01) | |

(52) U.S. Cl.
CPC ............ *B25J 9/1638* (2013.01); *B25J 9/104* (2013.01); *G05B 2219/39176* (2013.01); *Y10S 901/02* (2013.01); *Y10S 901/09* (2013.01)

(58) Field of Classification Search
USPC ................................................ 700/245–264
See application file for complete search history.

(56) References Cited

U.S. PATENT DOCUMENTS

| | | | |
|---|---|---|---|
| 4,449,885 A | | 5/1984 | Hertel et al. |
| 4,507,078 A | | 3/1985 | Tam et al. |
| 4,523,985 A | | 6/1985 | Dimock |
| 4,770,590 A | | 9/1988 | Hugues et al. |
| 4,819,167 A | | 4/1989 | Cheng et al. |
| 4,884,941 A | * | 12/1989 | Kazerooni ............... B24B 9/00 414/744.5 |
| 4,955,780 A | | 9/1990 | Shimane et al. |
| 5,418,441 A | * | 5/1995 | Furukawa .............. B25J 9/1641 318/568.22 |
| 5,483,138 A | | 1/1996 | Shmookler et al. |
| 5,546,179 A | | 8/1996 | Cheng |
| 5,563,798 A | | 10/1996 | Berken et al. |
| 5,682,795 A | * | 11/1997 | Solomon ................ B25J 9/1045 403/387 |
| 5,690,744 A | | 11/1997 | Landau |
| 5,704,062 A | | 1/1998 | Caroleo |
| 5,706,201 A | | 1/1998 | Andrews |
| 5,980,194 A | | 11/1999 | Freerks et al. |
| 6,085,125 A | * | 7/2000 | Genov .................. H01L 21/681 414/226.05 |

(Continued)

Primary Examiner — Jonathan L Sample
(74) Attorney, Agent, or Firm — Harrington & Smith

(57) ABSTRACT

A method including, based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

18 Claims, 12 Drawing Sheets

(56) References Cited

U.S. PATENT DOCUMENTS

| | | | | |
|---|---|---|---|---|
| 6,198,976 | B1 | 3/2001 | Sundar et al. | |
| 6,225,012 | B1* | 5/2001 | Nishi | G03F 7/70691 430/22 |
| 6,304,051 | B1 | 10/2001 | Sagues et al. | |
| 6,327,517 | B1 | 12/2001 | Sundar | |
| 6,405,101 | B1 | 6/2002 | Johanson et al. | |
| 6,464,448 | B1* | 10/2002 | Ha | B25J 9/104 414/744.5 |
| 6,489,741 | B1* | 12/2002 | Genov | B25J 9/1615 318/561 |
| 6,502,054 | B1 | 12/2002 | Mooring et al. | |
| 6,571,657 | B1* | 6/2003 | Olgado | B25J 9/1638 257/E21.175 |
| 6,629,053 | B1 | 9/2003 | Mooring | |
| 6,760,976 | B1 | 7/2004 | Martinson et al. | |
| 7,008,802 | B2 | 3/2006 | Lu | |
| 7,129,694 | B2* | 10/2006 | Brunner | H01L 21/67288 324/750.14 |
| 7,433,759 | B2 | 10/2008 | Nangoy | |
| 7,456,977 | B2* | 11/2008 | Ramsey | H01L 21/67259 348/94 |
| 7,792,350 | B2 | 9/2010 | Kiley et al. | |
| 7,894,657 | B2 | 2/2011 | Van Der Meulen et al. | |
| 7,933,665 | B2 | 4/2011 | Sakiya et al. | |
| 7,963,736 | B2 | 6/2011 | Takizawa et al. | |
| 8,224,607 | B2 | 7/2012 | Sakhare et al. | |
| 8,950,998 | B2* | 2/2015 | Meulen | B65G 25/02 414/217 |
| 9,026,244 | B1* | 5/2015 | Mazzocco | G05B 19/401 700/229 |
| 9,108,322 | B2* | 8/2015 | Chisholm | B25J 13/085 |
| 9,196,518 | B1 | 11/2015 | Hofmeister et al. | |
| 2003/0223057 | A1* | 12/2003 | Ramsey | H01L 21/67259 356/147 |
| 2004/0167743 | A1 | 8/2004 | Hosek | |
| 2005/0224902 | A1* | 10/2005 | Ramsey | H01L 21/67253 257/433 |
| 2005/0233770 | A1* | 10/2005 | Ramsey | H01L 21/67253 455/561 |
| 2006/0130750 | A1* | 6/2006 | Ishikawa | G03B 27/32 118/300 |
| 2007/0264106 | A1* | 11/2007 | van der Meulen | B25J 9/0084 414/217 |
| 2009/0038258 | A1* | 2/2009 | Pivac | B25J 5/00 52/749.14 |
| 2009/0232630 | A1* | 9/2009 | Roberts | H01L 21/67259 414/744.2 |
| 2009/0243413 | A1* | 10/2009 | Gilchrist | H02K 7/09 310/90.5 |
| 2010/0081095 | A1* | 4/2010 | Shibazaki | G03F 7/70775 430/325 |
| 2010/0157275 | A1* | 6/2010 | Shibazaki | G03F 7/70341 355/72 |
| 2012/0249992 | A1* | 10/2012 | Matsuura | H01L 21/68707 355/72 |
| 2013/0041509 | A1* | 2/2013 | Saito | B25J 9/06 700/261 |
| 2013/0071218 | A1* | 3/2013 | Hosek | H01L 21/67259 414/744.5 |
| 2015/0179491 | A1* | 6/2015 | Katsuda | B25J 9/1694 700/213 |
| 2015/0214086 | A1* | 7/2015 | Hofmeister | H01L 21/67709 414/744.5 |

* cited by examiner

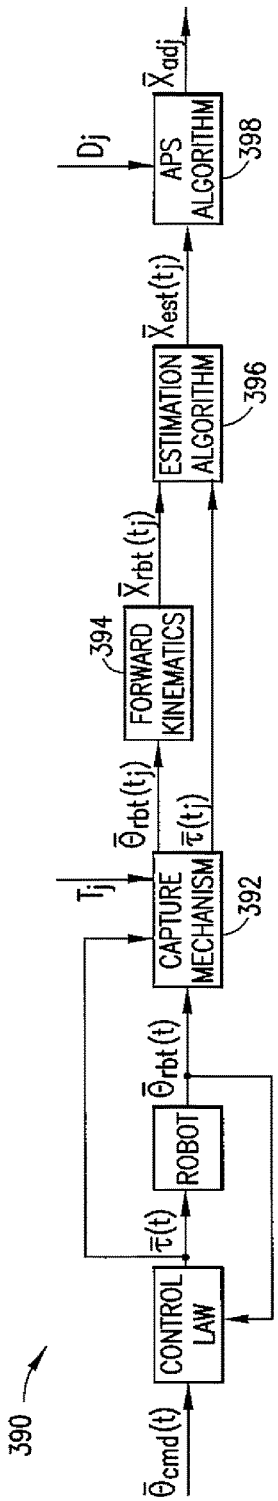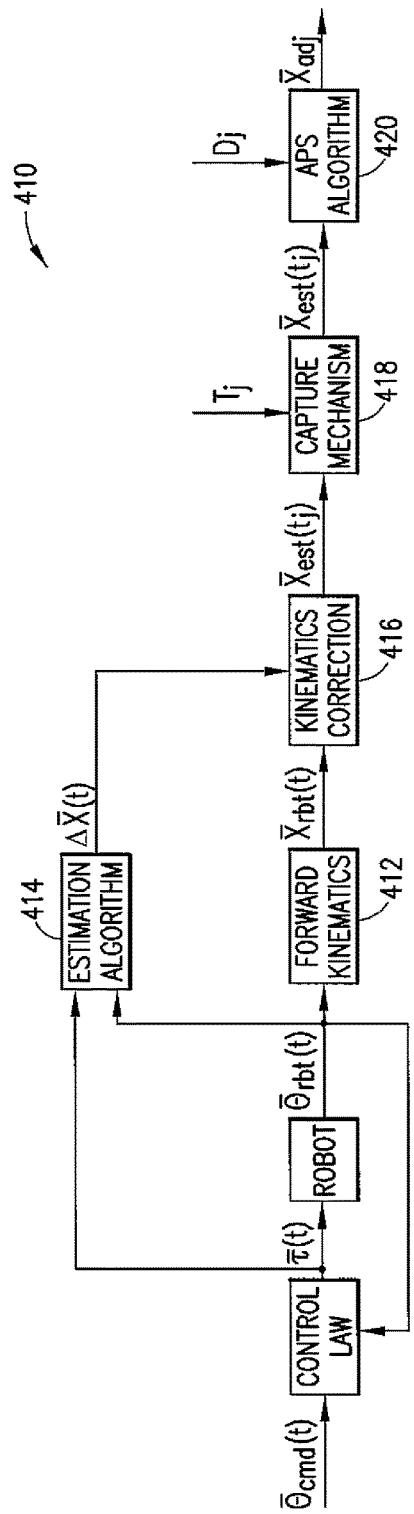

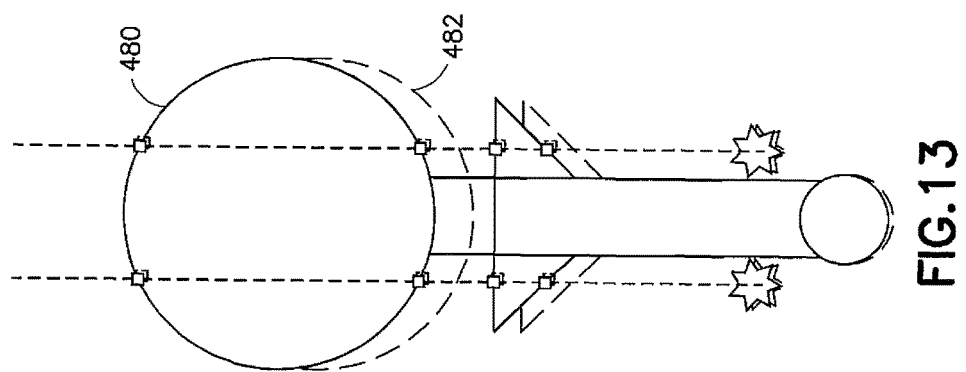
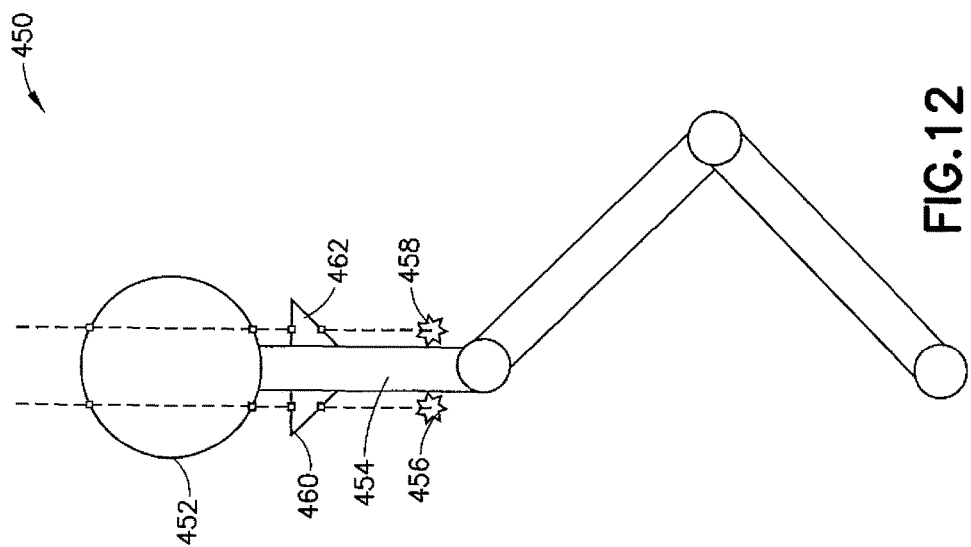

ROBOT ADAPTIVE PLACEMENT SYSTEM WITH END-EFFECTOR POSITION ESTIMATION

CROSS REFERENCE TO RELATED APPLICATIONS

This application claims priority on U.S. Provisional patent application No. 62/081,209 filed Nov. 18, 2014 which is hereby incorporated by reference in its entirety.

BACKGROUND

Technical Field

The exemplary and non-limiting embodiments relate generally to a robot and, more particularly, to controlling movement of a robot.

Brief Description of Prior Developments

Semiconductor processing systems utilize one or more robotic manipulators to accurately deliver silicon wafers, referred to as substrates, to process modules, metrology stations, load locks and other suitable locations. Since the substrates may not be accurately positioned in the locations from which they are picked by the robot (initial misalignment), and because the robot end-effector typically does not provide a means of mechanically centering the substrate on the robot end-effector, external sensors are often utilized to detect the edges of the substrate during motion of the robot. This may be used by a control system to adjust the motion of the robot and subsequently deliver (place) the substrate accurately; regardless of the initial misalignment.

To this end, the control system typically captures the positions of the robot axes (motors, joints) when the edges of the substrate are detected by the sensors, and uses the resulting data along with the expected radius of the substrate and the coordinates of the sensors to either (1) determine the eccentricity of the substrate and use this information to compensate for the eccentricity when completing the place operation or (2) directly adjust the end point of the robot motion to place the substrate accurately regardless of the initial misalignment of the substrate. The above type of adjustment is referred to as an Adaptive Placement System (APS).

The accuracy of the APS may be affected by mechanical imperfections, such as structural flexibilities and positioning errors in belt drives of the robotic manipulator, which may distort the relationship between the captured positions of the robot axes (motors, joints) and the corresponding actual positions of the robot end-effector. Typical structural flexibilities include a flexible frame of the drive section of the robot, flexible drive shafts (torsion and bending), flexible links, flexible joints, and elastic belts and bands, which tend to stretch under tension. Positioning errors in belt drives may result from hysteresis due to meshing errors between belt and pulley teeth.

The accuracy of the APS may be affected by temperature changes in the operating environment of the robot. Temperature changes will cause thermal expansion and contraction of the robot's components, the structural frame that the robot is attached to, and the station where the substrate is delivered to. Temperature changes may be non-uniform so that different components of the system are at different temperatures and have different amounts of relative expansion or contraction. The temperature can also vary over time with different parts of the system changing at different rates. The consequence of this thermal deformation is inaccuracy in the robot's calculation of the position of its end effector.

This calculation takes as its input the positions of the motors and uses pre-programmed knowledge of the geometry of the robot to calculate the position of the end effector. If the geometry of the robot is distorted by thermal effects, this calculation will be inaccurate. This affects the system in two ways. Inaccurate geometry will affect the ability of the system to position the end effector in the expected and desired location. Additionally in a system with APS, the positions of the motors are captured when the APS sensor is tripped and these data are used to calculate the position of the wafer on the end effector. These APS position capture data will be affected by an inaccurate model of the robot's geometry, causing further inaccuracy on substrate placement.

SUMMARY

The following summary is merely intended to be exemplary. The summary is not intended to limit the scope of the claims.

In accordance with one aspect, an example method comprises, based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

In accordance with another aspect, an example embodiment is provided in an apparatus comprising: at least one processor; and at least one non-transitory memory including computer program code, the at least one memory and the computer program code configured to, with the at least one processor, cause the apparatus to: based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

In accordance with another aspect, an example embodiment is provided in a non-transitory program storage device readable by a machine, tangibly embodying a program of instructions executable by the machine for performing operations, the operations comprising: based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

BRIEF DESCRIPTION OF THE DRAWINGS

The foregoing aspects and other features are explained in the following description, taken in connection with the accompanying drawings, wherein:

FIG. 10 is a diagram illustrating an example system;
FIGS. 11A-11C are diagrams illustrating example systems;
FIG. 12 is a diagram illustrating an example apparatus;
FIG. 13 is a diagram illustrating an example apparatus.

DETAILED DESCRIPTION OF EMBODIMENTS

Figure 1:
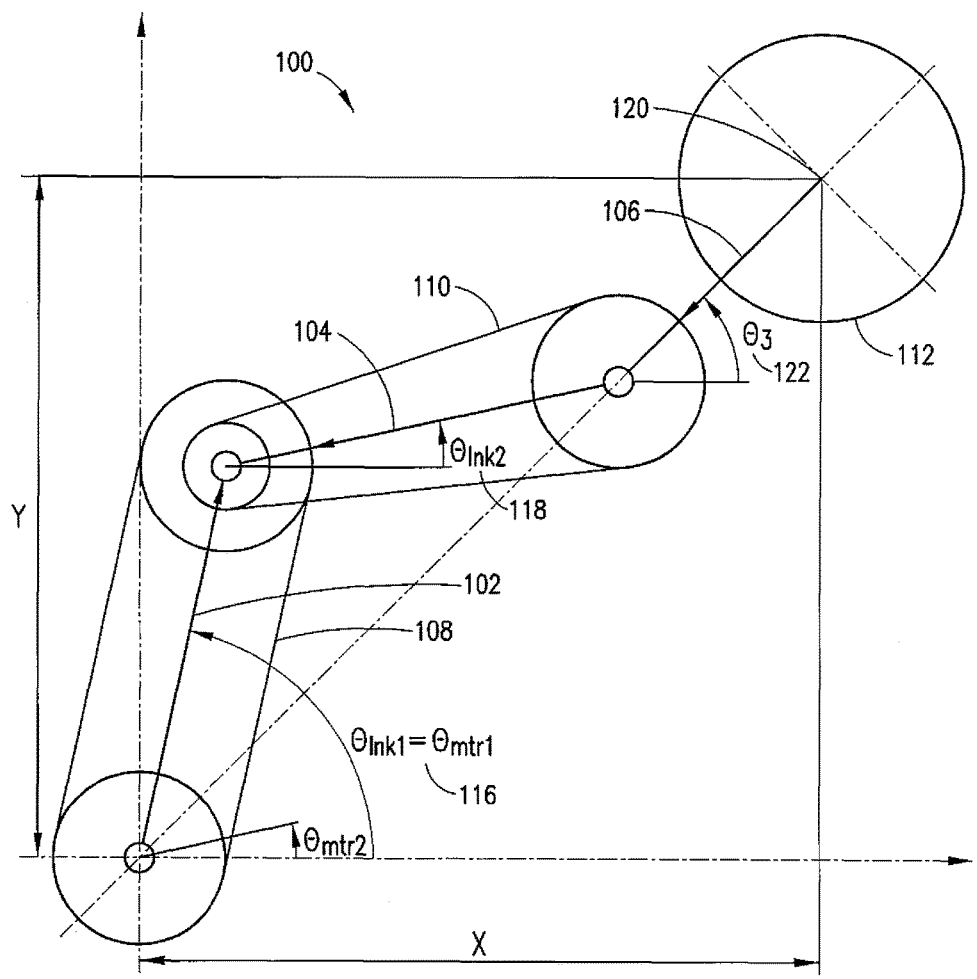
FIG. 1 is a diagram illustrating an example apparatus.

Referring to FIG. 1, there is shown a schematic top plan view of an example substrate processing apparatus having a substrate transport apparatus or robot system 100. Although the present invention will be described with reference to the embodiments shown in the drawings, it should be understood that the present invention may be embodied in many forms of alternative embodiments. In addition, any suitable size, shape or type of materials or elements could be used.

Typical structural flexibilities may include a flexible frame of the drive section of the robot, flexible drive shafts (torsion and bending), flexible links, flexible joints, and elastic belts and bands, which tend to stretch under tension. Positioning errors in belt drives may result from hysteresis due to meshing errors between belt and pulley teeth. It has been found that these manifest themselves as a memory-like phenomenon dependent on the moves performed by the robot. Features as described herein may use this memory-like phenomenon or otherwise.

During motion of the robot, the structural flexibilities, positioning errors in belt drives and other mechanical imperfections may cause a discrepancy between the actual end-effector position and the end-effector position calculated conventionally based on the captured positions of the robot axes (motors, joints) using a rigid-body kinematic model. This discrepancy causes errors in inputs to various sensor calibration and eccentricity correction routines effecting the performance of the APS.

If the operations performed by the robot are repeatable (i.e., the robot follows the same motion paths and identical velocity profiles), the effects of the structural flexibilities and other mechanical imperfections may be inadvertently, and only partially, reduced by calibration procedures; the primary intention of which is to determine the locations of the sensors and to estimate their latency and hysteresis characteristics. However, if the operations performed by the robot are not repeatable (including the cases where the robot follows substantially the same motion paths, but various motion profiles, such as due to different acceleration and/or speed settings for example), or if the effects of the structural flexibilities and other mechanical imperfections become significant (such as due to a growing size of the robot arms or an increasing size and weight of the substrates for example), the effects of the structural flexibilities need to be properly addressed in order to achieve the desired accuracy of the APS.

The present disclosure describes two key features: (1) a position capture mechanism that takes into account flexible dynamics, positioning errors in belt drives as well as other mechanical imperfections of a robot and reduces their effects, and (2) an adaptive placement system which utilizes the above position capture mechanism. The present disclosure also describes a mechanical modification to the end effector of the robot that is designed to interact with the APS sensors in a way that allows the robot's control software to estimate the amount of thermal deformation present when the robot extends to place a substrate.

Figure 17:
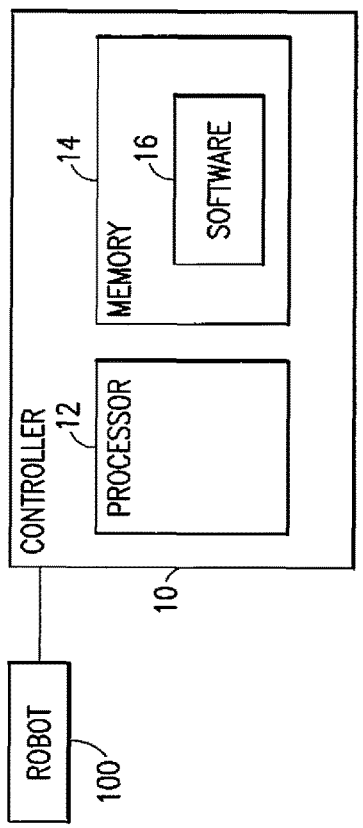
FIG. 17 is a diagram illustrating an example controller.

An example two-axis robotic arm 100 for a semiconductor processing system is depicted in a simplified diagrammatic form in FIG. 1. Referring also to FIG. 17, the arm or robot 100 is connected or otherwise comprises a controller 10. The controller 10, in this example, comprises a processor 12 and memory 14. The memory 14 includes software 16 configured to control the robot 100 as further understood from the description below. The arm 100 consists of the first link 102, second link 104 and third link 106. An electric motor may be utilized to actuate the first link. Another electric motor may be used to actuate the second link via a 1:1 belt drive 108. Another belt arrangement 110 may be employed to maintain radial orientation of the third link 106 regardless of the position of the first two links 102, 104. This may be achieved due to a 1:2 ratio between the pulley incorporated into the first link and the pulley connected to the third link. The third link 106 may form an end-effector that may carry a substrate 112. In the diagram of FIG. 1, the substrate 112 is shown positioned properly in its nominal location on the robot end-effector. An example robotic drive system is disclosed in U.S. Pat. No. 8,716,909 issued May 6, 2014 and entitled Robot with Heat Dissipating Stator which is hereby incorporated by reference herein in its entirety. A further example robotic drive system is disclosed in U.S. Pat. No. 9,149,936 issued Oct. 6, 2015 and entitled Robot with Unequal Link Length Arms which is hereby incorporated by reference herein in its entirety.

The example arm 100 of FIG. 1 typically operates in a horizontal plane. An additional electromechanical arrangement may be utilized to move the entire arm in the vertical direction.

The position of the example arm of FIG. 1 in a given horizontal plane may be uniquely defined by the angle of the first link, $\theta_{lnk1}$ 116, and the angle of the second link, $\theta_{lnk2}$ 118. The location of the center of the end-effector (a reference point on the end-effector that corresponds to the nominal location of the substrate carried by the robot) 120 may be described in a Cartesian coordinate system using an X-coordinate and a Y-coordinate, or in a polar coordinate system using a radial coordinate R and an angular coordinate T. Assuming that the example arm of FIG. 1 does not exhibit any mechanical imperfections, the location of the center of the end-effector, X and Y, as well as the orientation of the end-effector, $\theta_3$ 122, which is not independent in this case, may be calculated using the following equations:

$$X = l_1 \cos\theta_{lnk1} + l_2 \cos\theta_{lnk2} + l_3 \cos[(\theta_{lnk1}+\theta_{lnk2})/2]$$

$$Y = l_1 \sin\theta_{lnk1} + l_2 \sin\theta_{lnk2} + l_3 \sin[(\theta_{lnk1}+\theta_{lnk2})/2]$$

$$\theta_3 = (\theta_{lnk1}+\theta_{lnk2})/2 \tag{1}$$

where $l_1$ denotes the joint-to-joint length of the first link, $l_2$ is the joint-to-joint length of the second link and $l_3$ represents the distance between the pivot point of the end-effector and the center of the end-effector.

Assuming that one motor/encoder arrangement (motor 1) is directly coupled to the first link, and assuming also that another motor/encoder arrangement (motor 2) is directly attached to the pulley that drives the second link of the arm, and assuming further that the arm does not exhibit any mechanical imperfections, Equations (1) can be rewritten in the following form to describe the kinematic relationship between the measured axis coordinates (motor coordinates) and the end-effector coordinates (direct or forward kinematics):

$$X = l_1 \cos\theta_{mtr1} + l_2 \cos\theta_{mtr2} + l_3 \cos[(\theta_{mtr1}+\theta_{mtr2})/2]$$

$$Y = l_1 \sin\theta_{mtr1} + l_2 \sin\theta_{mtr2} + l_3 \sin[(\theta_{mtr1}+\theta_{mtr2})/2]$$

$$\theta_3 = (\theta_{mtr1}+\theta_{mtr2})/2 \quad (2)$$

where $\theta_{mtr1}$ denotes the angular position of motor 1 and $\theta_{mtr2}$ is the angular position of motor 2. Typically, positions $\theta_{mtr1}$ and $\theta_{mtr2}$ are measured in real time to facilitate motion control of the robot arm.

When the robot operates in a semiconductor processing system with an APS, the arm may move the substrate through one or more external sensors that may detect the leading and trailing edges of the substrate. At the same time, the control system may capture the positions of the robot axes (motors) when the edges of the substrate are detected by the sensors and, utilizing Equation (2), may convert the captured positions to the corresponding positions of the center of the end-effector. The resulting data along with the nominal (expected) radius of the substrate and the coordinates of the sensors may then be utilized to either (1) determine the eccentricity of the substrate and use this information to compensate for the eccentricity when completing the place operation or (2) directly adjust the end point of the robot motion to place the substrate accurately regardless of the initial misalignment of the substrate. The adjustment to the end point of the robot motion may be applied either in an on-the-fly manner by modifying the existing trajectory of the robot, or through an additional move executed once the existing trajectory has been completed. A suitable APS system and apparatus is disclosed in U.S. Pat. No. 9,196,518 issued Nov. 24, 2015 and entitled Adaptive Placement System and Method which is hereby incorporated by reference herein in its entirety. Another suitable APS system and apparatus is disclosed in U.S. patent application Ser. No. 13/295,419 filed Jun. 4, 2014 and entitled Robot and Adaptive Placement System and Method which is hereby incorporated by reference herein in its entirety.

Figure 2:
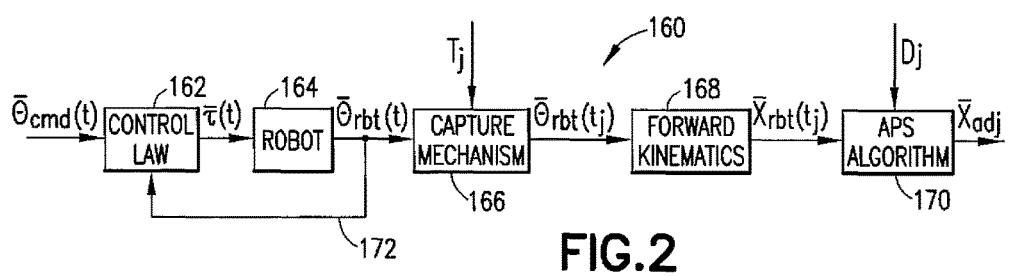
FIG. 2 is a diagram illustrating an example system.

The above process is illustrated by the block diagram 160 of FIG. 2, where $\bar{\theta}_{cmd}$ represents a vector of commanded joint positions, $\bar{\tau}$ denotes a vector of torques, $\bar{\theta}_{rbt}$ is a vector of measured joint positions, Tj represents a trigger event j, $t_j$ is the time of event $T_j$, $\bar{\theta}_{rbt}(t_j)$ is a vector of measured joint positions at the time tj, $\bar{X}_{rbt}(t_j)$ is a vector of end-effector coordinates calculated based on $\bar{\theta}_{rbt}(t_j)$, $D_j$ represents constant data used by the APS algorithm (e.g., the nominal radius of the substrate or the coordinates of the sensors), $\bar{X}_{adj}$ denotes a vector of adjusted coordinates of the end point of the robot motion, and t is time. In general, vectors $\bar{\theta}_{cmd}$, $\bar{\theta}_{rbt}$, $\bar{\theta}_{rbt}(t_j)$, $\bar{X}_{rbt}(t_j)$ and $\bar{X}_{adj}$ and should be treated as generalized coordinates (including distances and angles), and vector $\bar{\tau}$ should be interpreted as a vector of generalized forces (forces and torques). The system of FIG. 2 has control law 162, robot 164, capture mechanism 166, forward kinematics 168, APS algorithm 170 and feedback loop 172.

Considering the example robot arm 100 of FIG. 1, the above position and torque vectors may be defined as follows: $\bar{\theta}_{cmd} = [\theta_{cmd1}, \theta_{cmd2}]^T$, $\bar{\theta}_{rbt} = [\theta_{mtr1}, \theta_{mtr2}]^T$, $\bar{X}_{rbt} = [X, Y]^T$ or $\bar{X}_{rbt} = [X,Y]^T$ and $\bar{\tau} = [\tau_1, \tau_2]^T$ where $\theta_{cmdi}$ and $\tau_i$ denote the commanded position for motor i and torque of motor i, respectively, and i=1, 2.

In FIG. 2, the Forward Kinematics block 168 represents conversion of the captured joint positions to the corresponding end-effector coordinates. Considering the example robot arm of FIG. 1, Equation (2) may be used for this purpose. The APS Algorithm block 170 represents calculation of the adjusted coordinates of the end point of the robot motion.

If the robot exhibits structural flexibilities, positioning errors in belt drives or other mechanical imperfections, the calculated end-effector coordinates, $\bar{X}_{rbt}(t_j)$, which are used in the APS algorithm, may not accurately reflect the actual position of the robot end-effector, resulting in poor performance of the APS. In this case, the effects of the flexibilities need to be taken into account, as described below in greater detail.

Figure 3:
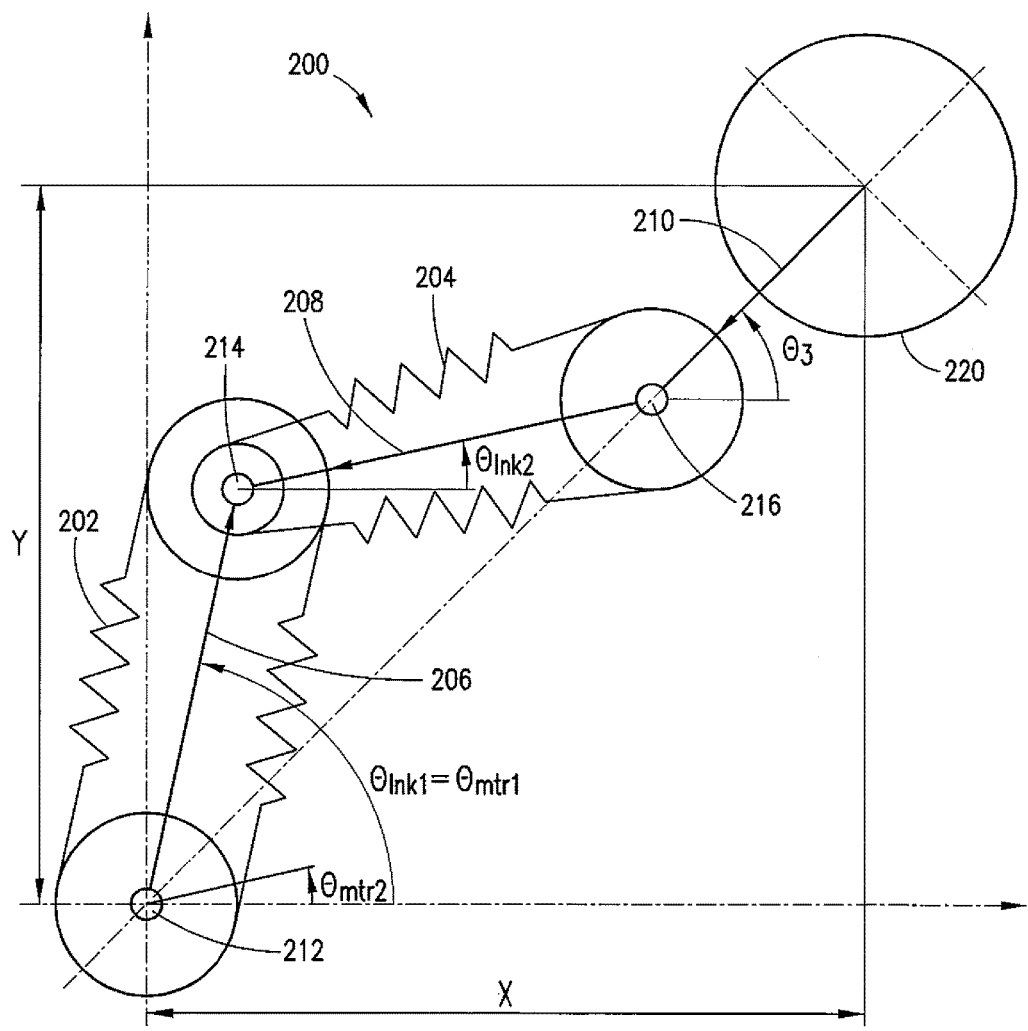
FIG. 3 is a diagram illustrating an example apparatus.

An example two-axis robotic arm 200 with longitudinally elastic belts 202, 204 is depicted in a simplified diagrammatic form in FIG. 3. Although two sets of belts are shown, the disclosed may be applied to drive arrangements with more or less belts or with more or less elastic elements. Although two links (upper arm 206 and forearm 208) and one end effector 210 with three rotary joints 212, 214, 216 are shown, more or less links, rotary joints or end effectors may be provided, for example with similar or different link lengths. For example, the disclosed may be applied with respect to drives and arms as disclosed in PCT Publication WO 2014/113364 A1 having an international publication date of Jul. 24, 2014 and entitled "Robot Having Arm With Unequal Link Lengths" which is hereby incorporated by reference herein in its entirety. In alternate aspects, any suitable arm and drive may be provided. The longitudinal elasticity of the belts 202, 204 is indicated by the symbols of springs in each of the branches of the belt arrangements. In the diagram of FIG. 3, the arm 200 is depicted in its equilibrium position where the forces in the two branches of each of the two belt arrangements are balanced, and the substrate 220 is shown positioned properly in its nominal location on the robot end-effector 210.

Figure 4:
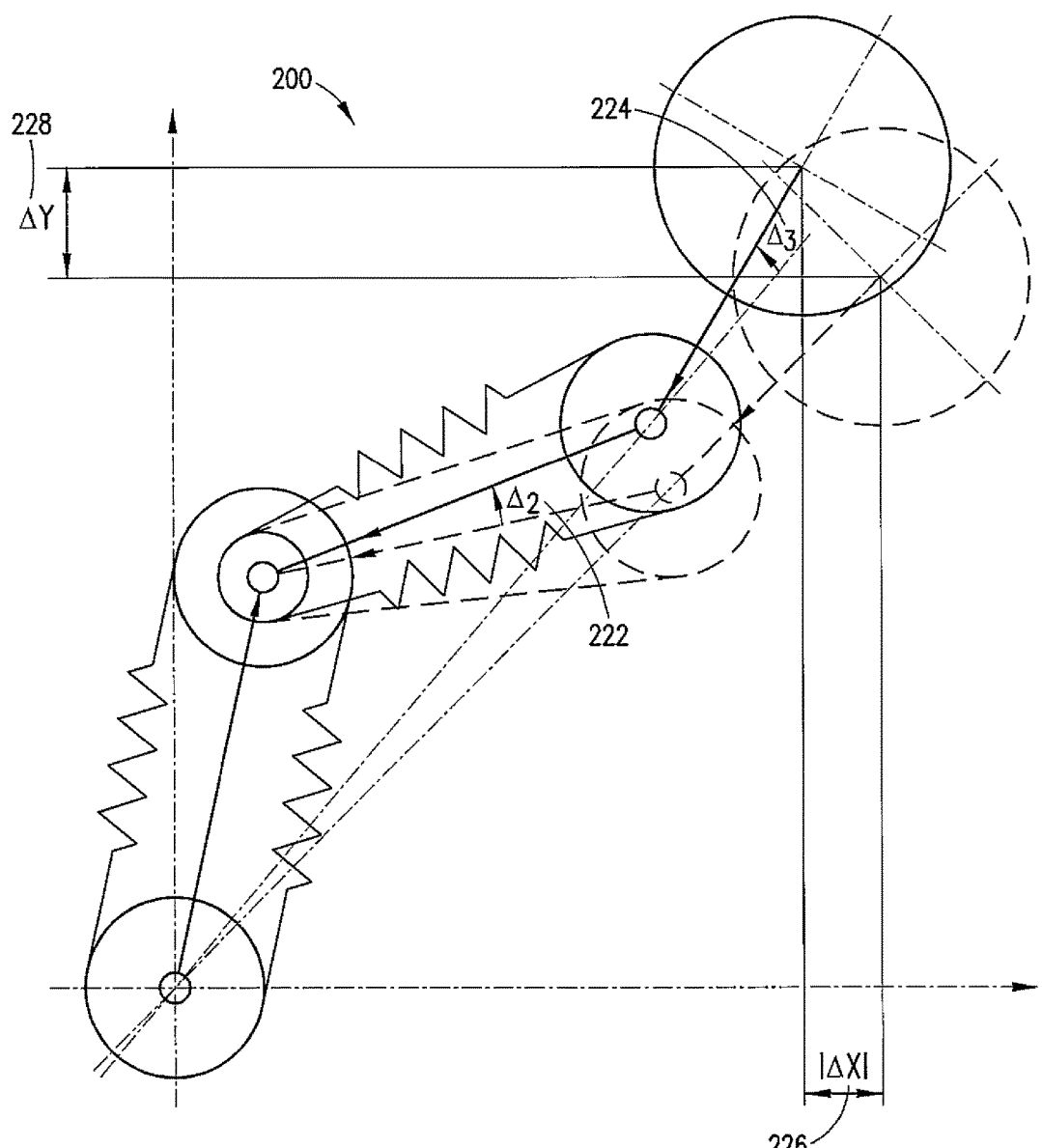
FIG. 4 is a diagram illustrating an example apparatus.

When the example robot arm of FIG. 3 moves, the belts may stretch longitudinally due to the forces transmitted through the belt arrangements, as illustrated diagrammatically in FIG. 4, resulting in errors in angular positions of the second and third links of the robot arm. Due to these errors, the direct kinematic equations (2) may no longer be accurate, and may need to be rewritten as follows:

$$X = l_1 \cos\theta_{mtr1} + l_2 \cos(\theta_{mtr2}+\Delta_2) + l_3 \cos[(\theta_{mtr1}+\theta_{mtr2}+\Delta_2)/2+\Delta_3]$$

$$Y = l_1 \sin\theta_{mtr1} + l_2 \sin(\theta_{mtr2}+\Delta_2) + l_3 \sin[(\theta_{mtr1}+\theta_{mtr2}+\Delta_2)/2+\Delta_3]$$

$$\theta_3 = (\theta_{mtr1}+\theta_{mtr2}+\Delta_2)/2+\Delta_3 \quad (3)$$

where $\Delta_2$ 222 is the error in the angular position of the second link and $\Delta_3$ 224 represents the error in the angular position of the third link. The resulting errors in the robot end-effector coordinates are shown as $\Delta X$ 226 and $\Delta Y$ 228 in FIG. 4.

Figure 5A:
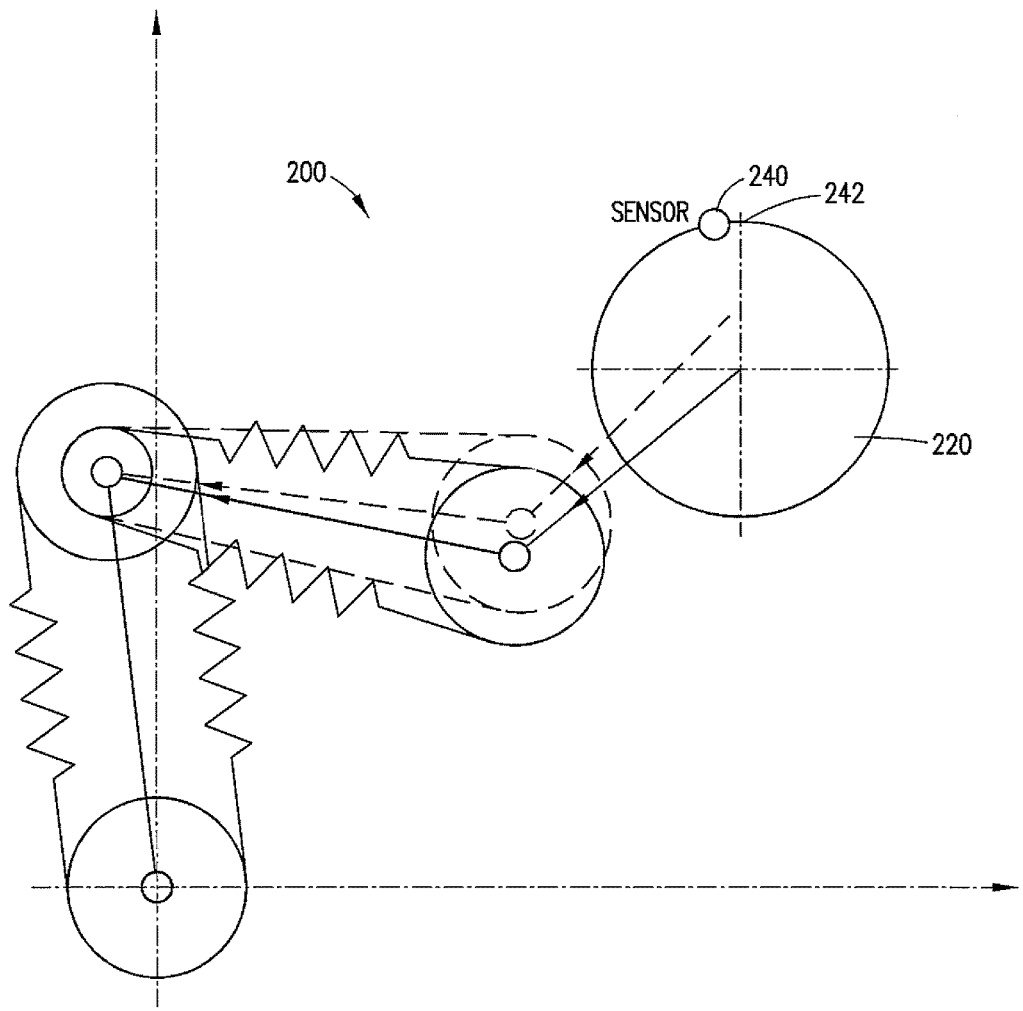
FIG. 5A is a diagram illustrating an example apparatus.
Figure 5B:
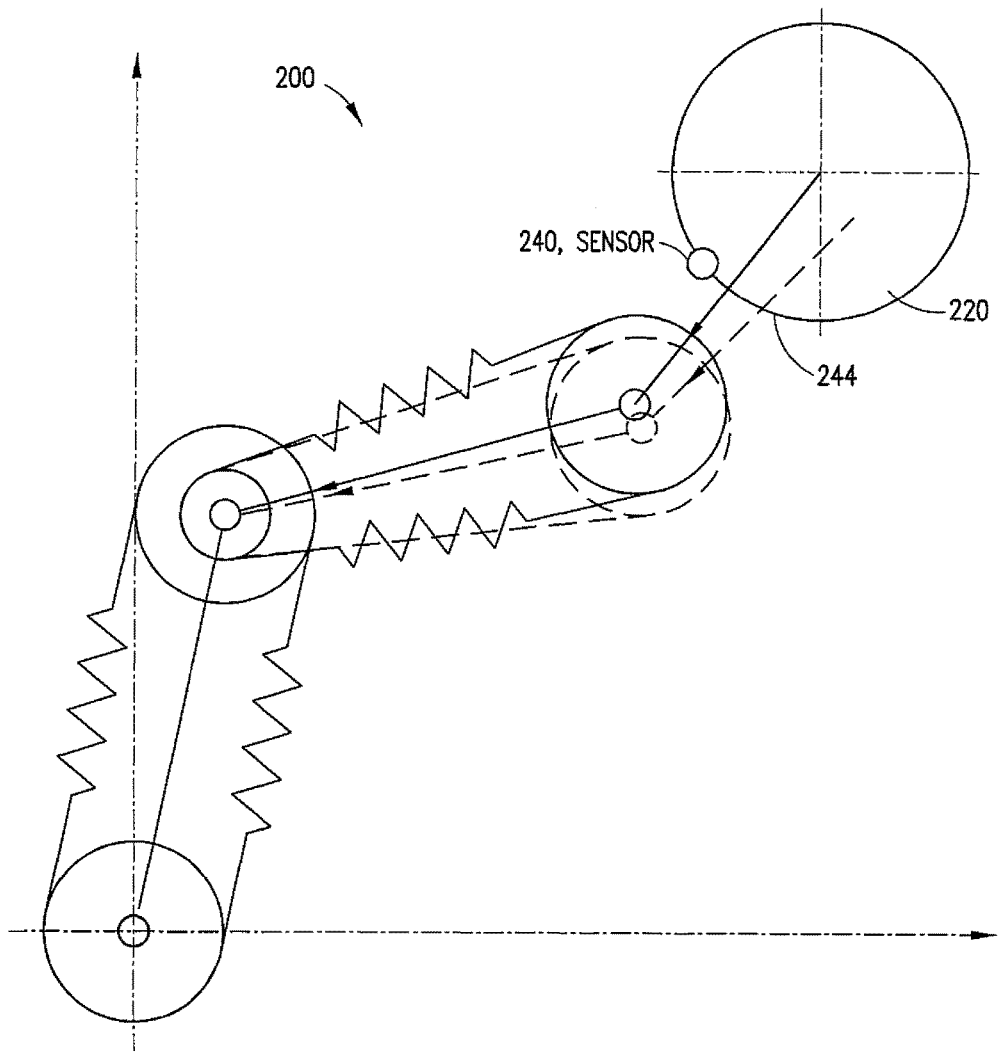
FIG. 5B is a diagram illustrating an example apparatus.

The above errors may impact the performance of the APS, as illustrated in FIGS. 5A and 5B. Considering an APS with a single sensor 240 as an example, the sensor 240 may detect the leading edge 242 of the substrate 220, see diagram (a), and the trailing edge 244 of the substrate 220, see diagram (b), as the robot 200 moves the substrate through the sensor. Black color in FIGS. 5a and 5b shows the example arm 200 of FIG. 3 with longitudinally elastic belts, grey color depicts an ideal representation of the arm, which is described by the conventional forward kinematic equations (2). The two detection events shown in diagrams (a) and (b) may be used to define two distinct points (typically in a coordinate system connected to the robot end-effector), which may be assumed to lie on the circumference of the substrate 220. Given the size (radius or diameter) of the substrate 220, these two points may be used to determine the location of the substrate on the robot end-effector, as illustrated in diagram FIG. 5c.

Figure 5C:
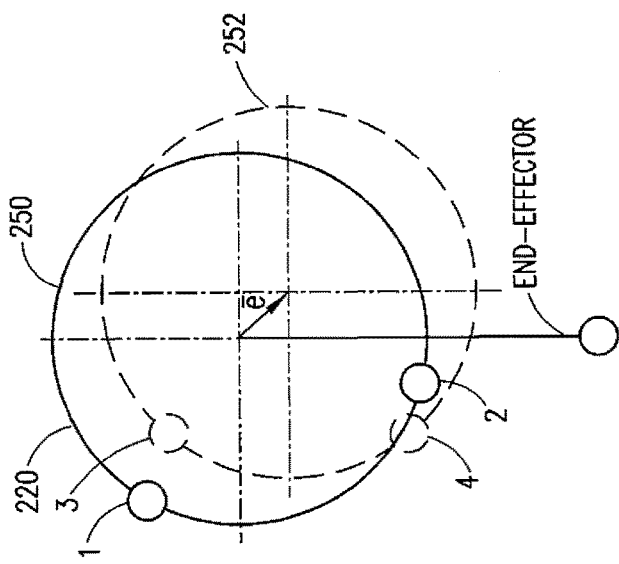
FIG. 5C is a diagram illustrating an example apparatus.

FIG. 5c shows the positions of the substrate 220 on the robot end-effector calculated by the APS algorithm based on the detection events shown in FIGS. 5a and 5b. The black circle 250 represents the position of the substrate as calculated by the APS algorithm with proper estimation of the effects of the longitudinal flexibility of the belts. Point 1 corresponds to the point on the circumference (leading edge) of the substrate which was detected by the sensor by the detection event of FIG. 5a, and point 2 corresponds to the point on the circumference (trailing edge) of the substrate detected by the sensor by the detection event of FIG. 5b. Similarly, the grey circle represents the position of the substrate on the robot end-effector as calculated by the APS algorithm using an ideal representation of the arm described by the conventional forward kinematic equations (2), which do not take into account the effects of the longitudinal flexibility of the belts. Point 3 corresponds to the point on the circumference (leading edge) of the substrate which was detected by the sensor by the detection event of FIG. 5a, and point 4 corresponds to the point on the circumference (trailing edge) of the substrate detected by the sensor by the detection event of FIG. 5b.

It is observed that the kinematic errors due to longitudinally elastic belts result in an error between the actual location of the substrate on the robot end-effector (black color) and the location obtained based on the conventional forward kinematic equations (grey color), as indicated by vector $\bar{e}$ in FIG. 5c. This directly translates to inaccurate placement when the substrate is delivered by the robot.

APS with End-Effector Position Estimation

Figure 6:
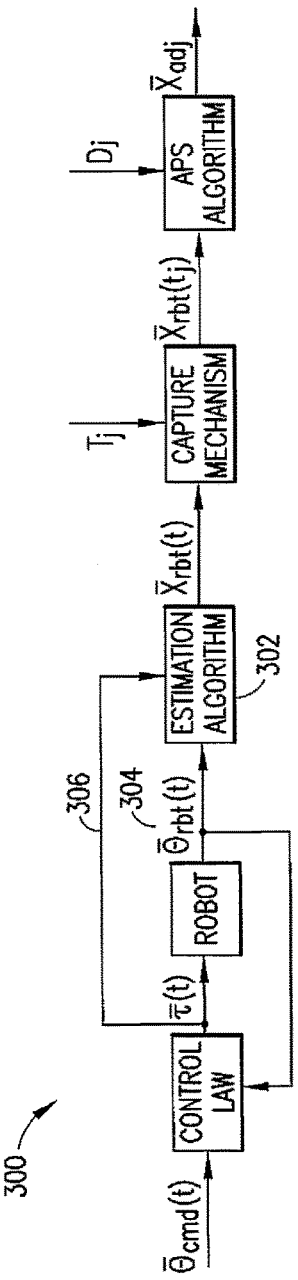
FIG. 6 is a diagram illustrating an example system.

In order to eliminate or reduce the impact of the above errors on the accuracy of the APS, an estimation algorithm may be used to take into account the errors, and the position capture mechanism may be modified as illustrated by the block diagram 300 of FIG. 6. As indicated in FIG. 6, the estimation algorithm 302 may periodically calculate the estimated coordinates of the robot end-effector, the capture mechanism may capture the estimated coordinates of the robot end-effector when the edges of the substrate are detected by the sensors of the APS, and the resulting data along with the nominal (expected) radius of the substrate and the coordinates of the sensors may then be utilized to either (1) determine the eccentricity of the substrate and use this information to compensate for the eccentricity when completing the place operation or (2) directly adjust the end point of the robot motion to place the substrate accurately regardless of the initial misalignment of the substrate. The adjustment to the end point of the robot motion may be applied either in a manner while the robot is finishing its move by modifying the existing trajectory of the robot, or through an additional move executed once the existing trajectory has been completed.

As indicated in the block diagram 300 of FIG. 6, the estimation algorithm 302 may utilize motor positions 304 (typically measured directly, e.g., using position encoders), motor velocities 304 (either measured directly, e.g., using tachometers, or calculated from motor position data), motor accelerations 304 (typically calculated from velocity or position data), and the torques 306 applied by the motors (or equivalent quantities representative of the motor torques, such as motor currents, voltages or PWM duty cycles). The estimation algorithm may utilize the above inputs to calculate the estimated coordinates of the robot end-effector in a substantially continuous manner or periodically at a suitable frequency, for instance, at the sampling frequency of the motor position measurements or at the frequency at which the control law is executed.

The estimation algorithm 302 in the block diagram of FIG. 6 may utilize the dynamic model of the robot, use a state observer or employ any other suitable technique to estimate the effects of the structural flexibilities on the position of the robot end-effector that cannot be measured directly by the sensors available in the robot. The estimation algorithm may also use a belt drive models to estimate the effects of belt positioning errors, and it may employ other suitable methods to estimate the effects of various other mechanical imperfections. Several non limiting examples are presented below.

Estimation of Flexibility Effects Using Dynamic Model

Considering the example robot arm of FIG. 4, the error 222 in the angular position of the second link (forearm) due to the longitudinal elasticity of the forearm belt drive may be estimated by direct application of the dynamic model of the robot arm.

If the inertia moment of the rotating components of motor 2, including any rotating components rigidly connected to the rotating components of motor 2, such as the belt drive pulley, can be neglected, the force transmitted through the belt arrangement that actuates the second link of the arm is determined directly by the torque applied by motor 2. The effect of the longitudinal elasticity of the belt on the angular position of the second link may then be determined according to the following expression:

$$\Delta_2 = -\tau_2/(k_2 r) \quad (4)$$

where $\tau_2$ is the torque produced by motor 2, $k_2$ represents the longitudinal stiffness of the belt arrangement that actuates the second link of the example robot arm, and r denotes the pulley radius of the belt arrangement that actuates the second link of the example robot arm.

If the inertia moment of the rotating components of motor 2, including any rotating components rigidly connected to the rotating components of motor 2, is not negligible, or if friction impedes rotary motion of these components, the presence of these phenomena may be easily taken into account by directly subtracting their effects from $\tau_2$. If $\ddot{\theta}_{cmd2}$ and $\dot{\theta}_{cmd2}$ are the angular acceleration and angular velocity of motor 2 respectively, $I_2$ is the inertia moment of the rotating components of motor 2, and $b_2$ is the coefficient of friction for the motor 2 assembly, then the balance of forces during the motion can be expressed as:

$$\tau_2 = I_2 \ddot{\theta}_{cmd2} + b_2 \dot{\theta}_{cmd2} - k_2 (r \cdot \Delta_2) \quad (5)$$

The effect of the longitudinal elasticity of the belt on the angular position of the second link is then:

$$\Delta_2 = (I_2 \ddot{\theta}_{cmd2} + b_2 \dot{\theta}_{cmd2} - \tau_2)/(k_2 r) \quad (6)$$

Estimation of Flexibility Effects Using State Observer

Considering again the example robot arm of FIG. 3, if the flexible dynamics associated with the longitudinal elasticity of the wrist belt drive is the dominant flexibility in the robot, the error 224 in the angular position of the third link (end-effector) due to this flexibility may be estimated using a reduced order state observer.

Estimation of Belt Positioning Error Effects

Positioning errors in belt drives represent another phenomenon that may distort the relationship between motor positions and end-effector coordinates of a robot for semiconductor processing systems. Considering the example robot arm of FIG. 3, belt positioning errors may result in additional contributions to the error in the angular position of the second link, $\Delta_2$, and the error in the angular position of the third link, $\Delta_3$, and, in turn, to the errors in the robot end-effector coordinates, $\Delta X$ and $\Delta Y$.

Considering a synchronous (toothed) belt drive as an example, the dominant factor that often contributes to positioning errors in such a belt drive system is the bias in meshing between the belt and pulley teeth, which may manifest itself as a memory-like phenomenon dependent on the moves performed by the robot in the past. The primary causes for meshing bias are clearances between the belt and pulley teeth and friction at the belt-pulley contact regions. Clearances result in the belt teeth shifting between the walls of the pulley groove and friction results in residual contact forces and tooth deformation. The resulting belt positioning errors may be estimated.

It should be noted that belt positioning errors may occur in other types of belt arrangements, including flat belts and metal bands, which are often used in robots for semiconductor processing systems. The above example methodology for estimation of positioning errors can be extended to such toothless belt drives. For instance, they can be treated as a limit case of a synchronous (toothed) belt arrangement in order to take into account the continuous nature of the belt-pulley interaction in a toothless belt drive system.

Direct Measurement of Flexibility Effects Using Auxiliary Sensors

The robot arm system may also be augmented with additional sensors attached to the structure that are designed so as to directly measure the flexibility in the structure during a robot move that includes an APS measurement. These sensors could be, for example, strain gauges or accelerometers. The sensors could be attached to the robot at any location that is suitable, for example, the outside of any link, the inside of any link, on a pulley, or on a belt.

The robot arm system may also be augmented with additional sensors that are not attached to the structure and make measurements using a non-contact technology. These non-contact sensors would also be designed so as to directly measure the flexibility in the structure during a robot move that includes an APS measurement. These sensors could be, for example, laser interferometers, laser range sensors, capacitive sensors, temperature sensors, optical light sensors, or cameras (for example 1-D or 2-D CCD arrays). The non-contact sensors could be installed within the robotic system (workspace) so as to take measurements at any suitable point on the robot arm such as the top, bottom, or sides of any link, or any other exposed surface that is suitable.

The auxiliary sensors described in this section may also be used in conjunction with one or more of the estimation algorithms described in previous sections. The estimation algorithms could be implemented in such a way so that they use the data from the auxiliary sensors solely, or use the data from the auxiliary sensors in conjunction with the data available from the robot control system including the measurements of generalized positions and generalized forces.

Figure 7:
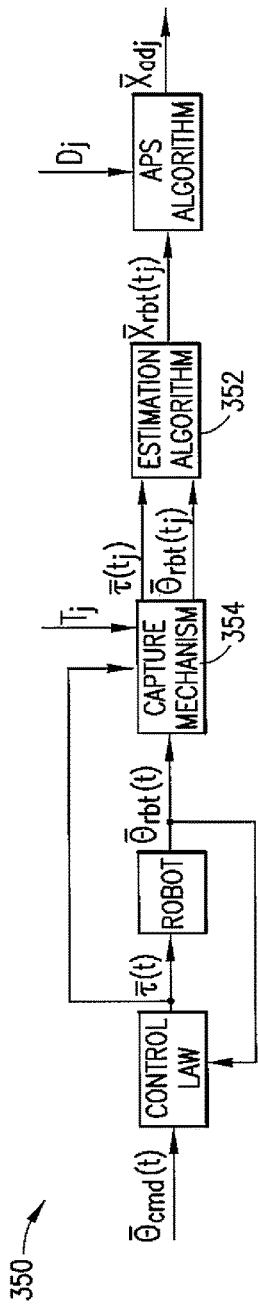
FIG. 7 is a diagram illustrating an example system.

As an alternative to the method represented by the block diagram of FIG. 6, the capture mechanism may be applied directly to the motor positions and torques, and these captured values may then serve as the inputs to the estimation algorithm. Refer to FIG. 7 for details.

Figure 8:
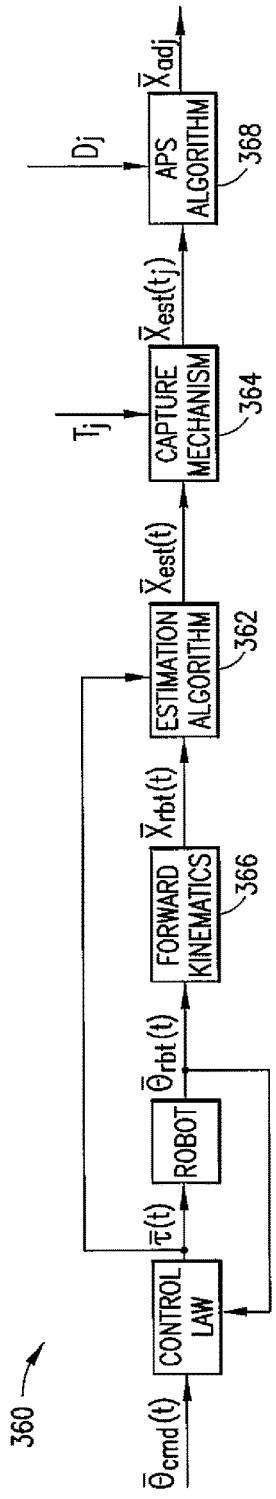
FIG. 8 is a diagram illustrating an example system.
Figure 9:
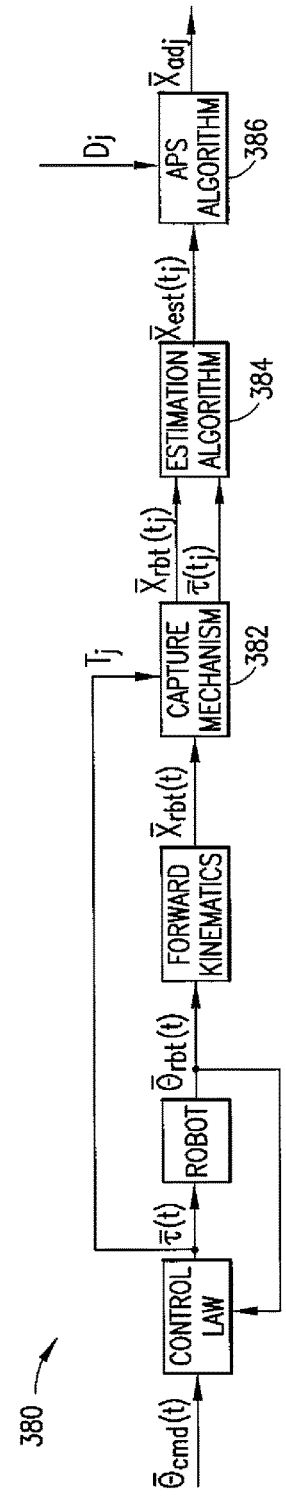
FIG. 9 is a diagram illustrating an example system.

As an alternative to the method represented by the block diagram of FIG. 6, the end-effector coordinates may be calculated using conventional forward kinematic equations, which do not take into account structural flexibilities, belt positioning errors and other imperfections, and then corrected for the effects of these phenomena before being used in the APS algorithm. In some cases, the correction may be calculated strictly based on the instantaneous values of the appropriate variables obtained from the capture mechanism. In other cases, when the effects of the imperfections depend on historic data, various variables may need to be processed periodically in order to achieve an accurate result. Refer to FIGS. 7-11 for details on the alternative embodiments. As an example, block diagram 350 in FIG. 7 shows estimation algorithm 352 being applied after the capture mechanism 354. As a further example, block diagram 360 in FIG. 8 shows estimation algorithm 362 being applied before the capture mechanism 364 with forward kinematics 366 upstream of capture mechanism 364. Similarly, FIGS. 9, 10 and 11 show alternative block diagrams 380, 390, 410 respectively.

As an alternative to the method represented by the block diagram of FIG. 6, the capture mechanism may be applied directly to the motor positions and torques, $\bar{\theta}_{rbt}$ and $\bar{\tau}$, and the captured values, $\bar{\theta}_{rbt}(t_j)$ and $\bar{\tau}(t_j)$, may then serve as the inputs to the estimation algorithm, as illustrated in FIG. 7.

As another alternative, the end-effector coordinates may be calculated using conventional forward kinematic equations, which do not take into account structural flexibilities, belt positioning errors and other imperfections, and then corrected for the effects of these phenomena before being used in the APS algorithm. In some cases, the correction may be calculated strictly based on the instantaneous values of the appropriate variables obtained from the capture mechanism. In other cases, when the effects of the imperfections depend on historic data, various variables may need to be processed periodically in order to achieve an accurate result.

For example, as illustrated in system 360 in FIG. 8, motor positions $\bar{\theta}_{rbt}$ may be processed using conventional forward kinematic equations 366, which do not take into account structural flexibilities, belt positioning errors and other imperfections, to obtain ideal end-effector coordinates $\bar{X}_{rbt}$. The ideal end-effector coordinates $\bar{X}_{rbt}$ along with motor torques $\bar{\tau}$ may then be used as inputs to an estimation algorithm 362 which may calculate estimated end-effector coordinates $\bar{X}_{est}$. The values $\bar{X}_{est}(t_j)$ of the estimated end-effector coordinates $\bar{X}_{est}$ determined by a capture mechanism 364 then may serve as inputs to the APS algorithm 368.

As an alternative to the example of FIG. 8, the capture mechanism 382 may be applied to the ideal end-effector coordinates $\bar{X}_{rbt}$ and motor torques $\bar{\tau}$, as depicted in the block diagram 380 of FIG. 9. The resulting captured values, $\bar{X}_{rbt}(t_j)$ and $\bar{\tau}(t_j)$, may then be processed by an estimation algorithm 384 to determine the corresponding estimated end-effector coordinates $\bar{X}_{est}(t_j)$, which in turn may serve as inputs to the APS algorithm 386

As yet another alternative to the example of FIG. 8, the capture mechanism 392 may be applied directly to motor positions $\bar{\theta}_{rbt}$ and motor torques $\bar{\tau}$, which scenario is illustrated in the block diagram 390 of FIG. 10. The captured values $\bar{\theta}_{rbt}(t_j)$ of motor positions $\bar{\theta}_{rbt}$ may be converted using conventional forward kinematic equations 394 to the corresponding ideal end-effector coordinates $\bar{X}_{rbt}(t_j)$, which may be fed along with the captured values $\bar{\tau}(t_j)$ of the motor torques $\bar{\tau}$ into an estimation algorithm 396, producing the corresponding estimated end-effector coordinates $\bar{X}_{est}(t_j)$. Finally, the estimated end-effector coordinates $\bar{X}_{est}(t_j)$ may be used as inputs to the APS algorithm 398.

As another example of system 410 in FIG. 11A, motor positions $\bar{\theta}_{rbt}$ may be processed using conventional forward kinematic equations 412, which do not take into account structural flexibilities, belt positioning errors and other imperfections, to obtain ideal end-effector coordinates $\bar{X}_{rbt}$. In addition, motor positions $\bar{\theta}_{rbt}$ along with motor torques $\bar{\tau}$ may be used in an estimation algorithm 414 to produce corrections $\Delta \bar{X}$, which then may be applied to ideal end-effector coordinates $\bar{X}_{rbt}$ to compensate for structural flexibilities, belt positioning errors and other imperfections, as indicated by the "kinematics correction" block 416 in FIG. 11. The corrected end-effector coordinates $\bar{X}_{est}$ may be fed through a capture mechanism 418 to the APS algorithm 420.

Figure 11B:
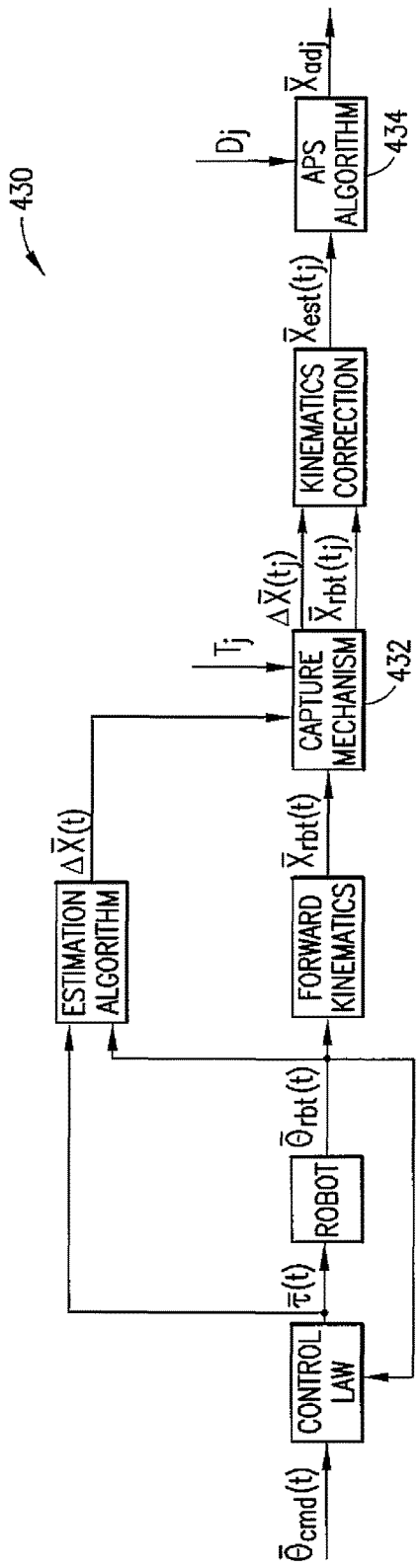

Alternatively to the example of FIG. 11A, system 430 is shown in FIG. 11B where the position capture mechanism 432 may be applied to ideal end-effector coordinates $\bar{X}_{rbt}$ and to corrections $\Delta \bar{X}$, and the resulting values, $\bar{X}_{rbt}(t_j)$ and $\Delta \bar{X}(t_j)$, and may be used to calculate the corresponding values of corrected end-effector coordinates, $\bar{X}_{est}(t_j)$, which may then be fed to the APS algorithm 434.

Figure 11C:
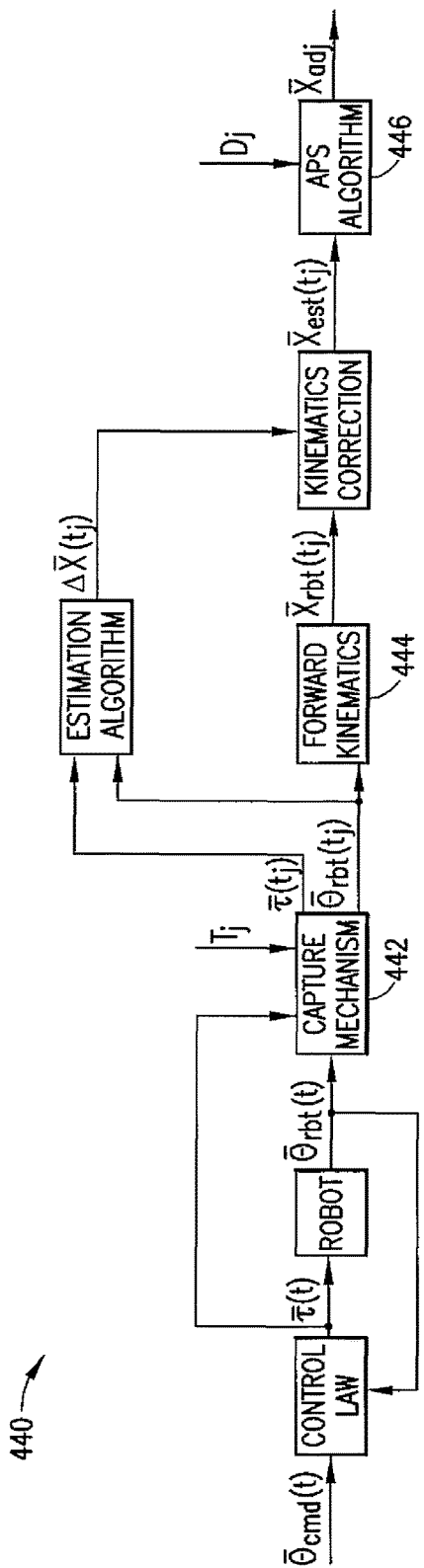

As yet another alternative to the example of FIG. 11A, the capture mechanism 442 may be applied directly to motor positions $\bar{\theta}_{rbt}$ and motor torques $\bar{\tau}$, which case is illustrated in the block diagram 440 of FIG. 11C. The resulting values $\bar{\theta}_{rbt}(t_j)$ of motor positions $\bar{\theta}_{rbt}$ may be converted using conventional forward kinematic equations 444 to the corresponding ideal end-effector coordinates $\bar{X}_{rbt}(t_j)$. In addition, the captured values $\bar{\theta}_{rbt}(t_j)$ and $\bar{\tau}(t_j)$ may be used to calculate the corresponding values of corrections $\Delta \bar{X}(t_j)$, which may be applied to the corresponding ideal end-effector coordinates, $\bar{X}_{rbt}(t_j)$, to calculate the corresponding estimated end-effector coordinates, $\bar{X}_{est}(t_j)$. Finally, the values $\bar{X}_{est}(t_j)$ may be fed to the APS algorithm 446.

For instance, considering again the example robot arm of FIG. 3, and assuming that the flexible dynamics associated with the longitudinal elasticity of the forearm belt drive is the dominant flexibility in the robot, the actual coordinates of the end-effector may be estimated using the following expressions:

$$\Delta_2(t_j) = -\tau_2(t_j)/(k_2 r) \quad (7)$$

$$T_{corrected}(t_j) = T(t_j) + \Delta_2(t_j)/2 \quad (8)$$

$$R_{corrected}(t_j) = 2l \cos[\alpha(t_j) - \Delta_2(t_j)/2] + l_3 \quad (9)$$

where $$\alpha(t_j) = a \cos\{[R(t_j) - l_3]/(2l)\} \quad (10)$$

In the above equations, $\Delta_2(t_j)$ is the error in the angular position of the second link, and $\tau_2(t_j)$ is the torque produced by motor 2, both at the time $t_j$ of capture event j, $k_2$ represents the longitudinal stiffness of the belt arrangement that actuates the second link of the example robot arm, and r denotes the pulley radius of the belt arrangement that actuates the second link of the example robot arm. $T_{corrected}(t_j)$ is the corrected angular coordinate of the robot end-effector, $T(t_j)$ is the angular coordinate of the end-effector calculated using conventional kinematic equations, $R_{corrected}(tj)$ is the corrected radial coordinate of the robot end-effector and $R(t_j)$ is the radial coordinate of the end-effector calculated using conventional kinematic equations, all at the time $t_j$ of capture event j. Finally, l denotes the joint-to-joint length of the first and second links of the robot arm (in this particular example, the two links are assumed to be of the same length), and $l_3$ represents the distance between the pivot point of the end-effector and the center of the end-effector.

The estimation algorithm in the block diagram of FIG. 6 (and its derivatives described earlier in this section) is not limited to the example arm of FIG. 3, and may be designed to estimate the coordinates of the robot end-effector regardless of the number of axes of the robot or the type of the mechanism of the robot arm. The technique may be extended to robots with multiple end-effectors.

The estimation algorithm may be employed to estimate effects of various other mechanical imperfections and physical phenomena that may distort the relationship between the measured robot axis positions and the coordinates of the robot end-effector, which typically cannot be measured directly. This includes, but is not limited to, flexibilities in gearboxes, meshing errors in gearboxes, flexibilities in robot joints, clearances in robot joints, frictional effects and thermal effects (expansion and contraction of components due to differences or changes in temperature).

The estimation algorithm may also be used to estimate the velocity of the robot end-effector (including the magnitude and direction of the translational component and the angular component of the velocity of the end-effector). This information may be utilized in various calibration and compensation algorithms as part of the APS.

The APS algorithm in the block diagram of FIG. 6 may include various calibration and compensation algorithms including, but not limited to, compensation for sensor latency, compensation for sensor hysteresis, detection of substrate breakage and detection of alignment fiducials, which may be present at the circumference of some substrates.

FIG. 12 shows an illustration of a robot 450 (SCARA type in this example). As the robot 450 extends to a station with a substrate 452 on the end effector 454, the APS sensors 456, 458 are tripped by the edges of the wafer and the robot positions are captured at those instants to enable the APS station placement correction calculation. FIG. 12 provides the addition of two triangular flags 460, 462 attached to the end effector. Ideally, these will be located as close to the substrate as possible, but alternative placements will also work. The flags 460, 462 are positioned so that they will cause additional transitions of the APS sensors during the extend to the station. The robot positions captured from these additional APS sensor transitions may be used to estimate the amount of thermal deformation present in that moment. It is assumed that a calibration of APS is performed with the system in a known thermal state where the nominal geometry is known accurately. Although flags 460, 462 are shown as being triangular in shape, any suitable shape may be provided to determine the actual position of the end effector using the sensors in combination with known or calibrated sensor positions and known or calibrated flag positions with respect to the end effector center or any suitable reference location on the end effector, arm or otherwise. Although the use of flags 460, 462 are described in reference to detecting and correcting for thermal deformation, in alternate aspects, the use of flags 460, 462 in combination with the sensors and encoder captured positions at the flag/sensor transitions may be used otherwise, for example, for the detection of the actual location of the end effector as a replacement of or to compliment the estimation algorithm described above or for any other suitable use.

In one form of thermal deformation, the radial position of the robot can be stretched due to increased temperature of the end effector. In this case, the APS transitions will occur slightly earlier during the extend motion as shown in FIG. 13 due to the deformed state 480 as opposed to the un deformed state 482. The sensor transitions associated with the flags on the end effector can be used to estimate the amount of thermal expansion in the radial direction. This is done by a direct comparison between the radial position as captured during the calibration procedure performed at the nominal temperature to the radial position captured during the present extend move to place a substrate. If the end effector expands radially due to increased temperature, the captured radial location during the transitions on the leading edge of the flag will have a smaller value because the sensor is tripped earlier than normal.

Figure 14:
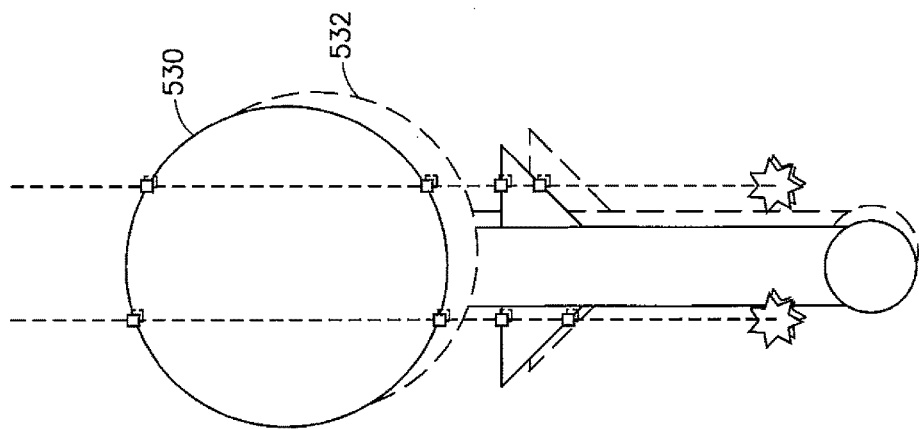
FIG. 14 is a diagram illustrating an example apparatus.

In another form of thermal deformation, the tangential position of the robot can be shifted due to increased temperature of the forearm link as shown in FIG. 14 due to the deformed state 510 as opposed to the un deformed state 512. In this case, the leading edge transition of the flag is unchanged, but the trailing edge transitions are earlier on one side and later on the opposite side. These measurements, done while the robot is moving with the normal APS sensor position capture mechanism, can be used to calculate the amount of tangential inaccuracy caused by thermal deformation and can be used to estimate the actual link lengths of the robot.

Figure 15:
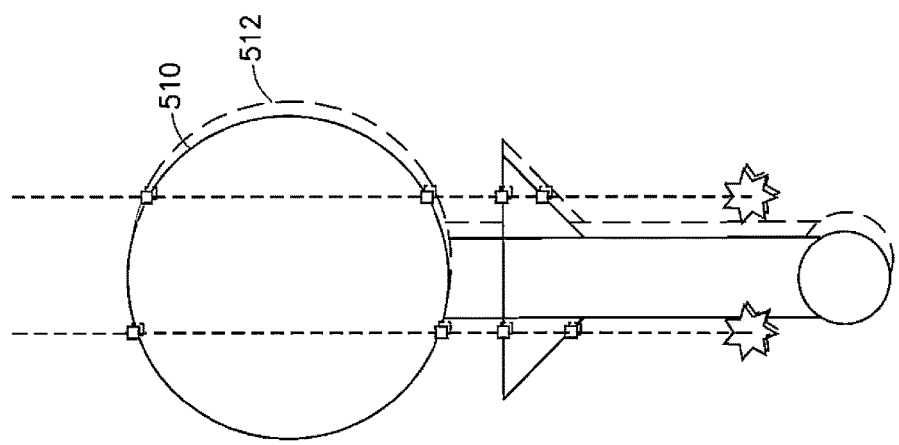
FIG. 15 is a diagram illustrating an example apparatus.

Combinations of radial and tangential distortion can be estimated by combining the end effector flag APS sensor transition data from the leading and trailing edges. An example illustration of this is shown in FIG. 15 showing the deformed state 530 as opposed to the un deformed state 532.

Figure 16:
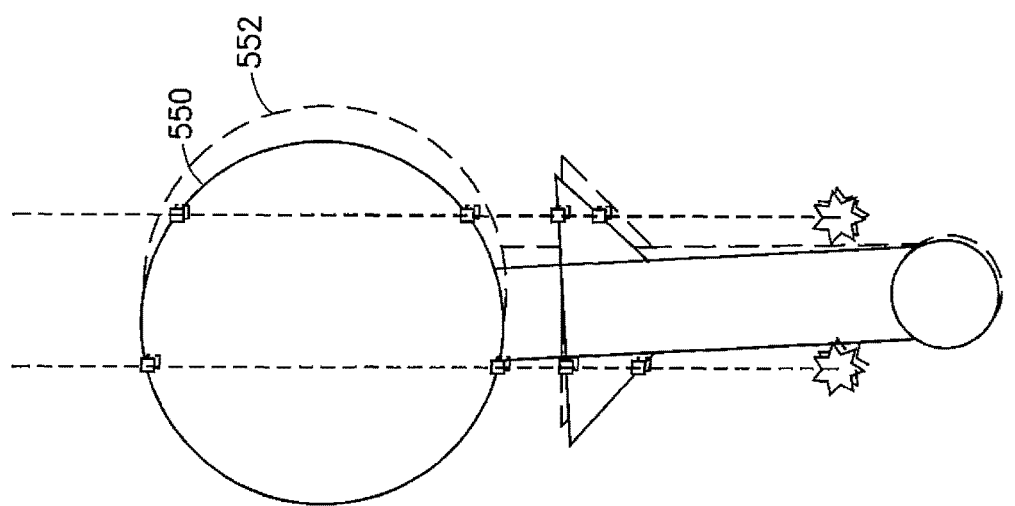
FIG. 16 is a diagram illustrating an example apparatus.

Thermal deformation that results in change to the orientation of the end effector can also be detected using this method; see FIG. 16 showing the deformed state 550 as opposed to the un deformed state 552. In this case, there will be a change to all of the APS sensor transitions caused by the flags, with the leading edge transitions shifting in time in opposite directions.

In general it will be possible to discern the magnitude of thermal distortions in the radial, tangential, and rotational axes even when those distortions are present concurrently. From this, the distortion of the robot's geometry (e.g. link lengths) can be calculated or estimated by formulae that will be specific to the type of robot in use. The updated geometry can then be used for the kinematics calculations, thus improving the accuracy of substrate placement.

In accordance with one aspect of the disclosed, a method is provided comprising: based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

In accordance with another aspect of the disclosed, a method is provided where the command transmission comprises a command torque transmission which is transmitted to the at least one motor to generate a predetermined torque vector.

In accordance with another aspect of the disclosed, a method is provided where the estimated deflection for the at least one member of the robot comprises at least one of: a flexible frame member of a drive section of the robot, a flexible drive shaft of the at least one motor, a flexible link of an arm of the robot, a flexible joint between links of the arm of the robot, and an elastic belt or band of the arm of the robot.

In accordance with another aspect of the disclosed, a method is provided where the estimating comprises at least one of: estimation of flexibility effects using dynamic modeling, estimation of flexibility effects using a state observer, estimation of belt positioning error effects, and direct measurement of flexibility effects using at least one auxiliary sensor.

In accordance with another aspect of the disclosed, a method is provided where the estimating of the deflection is based, at least partially, upon location information from at least one sensor regarding at least one of: a portion of the robot, and a substrate carried by the robot.

In accordance with another aspect of the disclosed, a method is provided where the adjusting of movement of the robot is based upon a combination of the calculated end effector coordinates and the location information from the at least one sensor.

In accordance with another aspect of the disclosed, a method is provided where the adjusting of movement of the robot is further based upon forward kinematics determination of the end effector which subsequently provides modified estimated end effector coordinates to an adaptive placement system (APS) to determine adjusted end effector coordinates to be used to drive the at least one motor of the robot.

In accordance with another aspect of the disclosed, a method is provided where adjusting movement of the robot comprises providing the calculated end effector coordinates to an adaptive placement system (APS) to determine adjusted end effector coordinates to be used to drive the at least one motor of the robot.

In accordance with another aspect of the disclosed, a method is provided where the calculated end effector coordinates are provided to a robot location sensing system and/or to a substrate location sensing system, which subsequently provides modified estimated end effector coordinates to an adaptive placement system (APS) to determine adjusted end effector coordinates to be used to drive the at least one motor of the robot.

In accordance with another aspect of the disclosed, an apparatus is provided comprising: at least one processor; and at least one non-transitory memory including computer program code, the at least one memory and the computer program code configured to, with the at least one processor, cause the apparatus to: based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

In accordance with another aspect of the disclosed, an apparatus is provided where the command transmission comprises a command torque transmission which is transmitted to the at least one motor to generate a predetermined torque vector.

In accordance with another aspect of the disclosed, an apparatus is provided where the estimated deflection for the at least one member of the robot comprises at least one of: a flexible frame member of a drive section of the robot, a flexible drive shaft of the at least one motor, a flexible link of an arm of the robot, a flexible joint between links of the arm of the robot, and an elastic belt or band of the arm of the robot.

In accordance with another aspect of the disclosed, an apparatus is provided where the estimating comprises at least one of: estimation of flexibility effects using dynamic modeling, estimation of flexibility effects using a state observer, estimation of belt positioning error effects, and direct measurement of flexibility effects using at least one auxiliary sensor.

In accordance with another aspect of the disclosed, an apparatus is provided where the estimating of the deflection is based, at least partially, upon location information from at least one sensor regarding at least one of: a portion of the robot, and a substrate carried by the robot.

In accordance with another aspect of the disclosed, an apparatus is provided where the adjusting of movement of the robot is based upon a combination of the calculated end effector coordinates and the location information from the at least one sensor.

In accordance with another aspect of the disclosed, an apparatus is provided where the adjusting of movement of the robot is further based upon forward kinematics determination of the end effector which subsequently provides modified estimated end effector coordinates to an adaptive placement system (APS) to determine adjusted end effector coordinates to be used to drive the at least one motor of the robot.

In accordance with another aspect of the disclosed, an apparatus is provided where the adjusting of the movement of the robot comprises providing the calculated end effector coordinates to an adaptive placement system (APS) to determine adjusted end effector coordinates to be used to drive the at least one motor of the robot.

In accordance with another aspect of the disclosed, an apparatus is provided where the calculated end effector coordinates are provided to a robot location sensing system and/or to a substrate location sensing system, which subsequently provides modified estimated end effector coordinates to an adaptive placement system (APS) to determine adjusted end effector coordinates to be used to drive the at least one motor of the robot.

In accordance with another aspect of the disclosed, a non-transitory program storage device readable by a machine, tangibly embodying a program of instructions executable by the machine for performing operations is provided, the operations comprising: based at least partially upon a command transmission to at least one motor of a robot, estimating deflection for at least one member of the robot during movement of the robot; based at least partially upon the estimated deflection, determining calculated end effector coordinates for an end effector of the robot; and based at least partially upon the calculated end effector coordinates, adjusting movement of the robot for placing a substrate, located on the robot, at a desired location.

In accordance with another example embodiment, an apparatus may be provided comprising means, based at least partially upon a command transmission to at least one motor of a robot, for estimating deflection for at least one member of the robot during movement of the robot; means, based at least partially upon the estimated deflection, for determining calculated end effector coordinates for an end effector of the robot; and means, based at least partially upon the calculated end effector coordinates, for adjusting movement of the robot for placing a substrate, located on the robot, at a desired location.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
sensing a substrate by at least one sensor as the substrate is moved past the at least one sensor, where the substrate is on an end effector of a robot;
calculating, by a controller, model end effector coordinates of the end effector when the at least one sensor senses the substrate moving past the at least one sensor, where the controller comprises at least one processor and at least one non-transitory memory, where an adaptive placement system is provided configured to use the sensing of the substrate by the at least one sensor and to use of the calculated model end effector coordinates to control placing of the substrate at a desired position;
estimating by the controller deflection for at least one member of the robot during movement of the robot;
based at least partially upon the estimated deflection, determining by the controller estimated end effector coordinates for the end effector of the robot;
generating by the controller at least one signal, which is based at least partially upon the estimated end effector coordinates; and
adjusting movement of the robot by the adaptive placement system based at least partially upon the at least one signal generated by the controller, the sensing of the substrate by the at least one sensor, and the calculated model end effector coordinates for placing the substrate at a desired location.

2. A method as in claim 1 where the estimating by the controller is based, at least partially, upon a command transmission to at least one motor of the robot, where the command transmission comprises a command torque transmission which is transmitted to the at least one motor to generate a predetermined torque vector.

3. A method as in claim 1 where the estimated deflection for the at least one member of the robot comprises at least one of:
a flexible frame member of a drive section of the robot,
a flexible drive shaft of the at least one motor,
a flexible link of an arm of the robot,
a flexible joint between links of the arm of the robot, and
an elastic belt or band of the arm of the robot.

4. A method as in claim 1 where the estimating comprises at least one of:
estimation of flexibility effects using dynamic modeling,
estimation of flexibility effects using a state observer,
estimation of belt positioning error effects, and
direct measurement of flexibility effects using at least one auxiliary sensor.

5. A method as in claim 1 where the estimating of the deflection is based, at least partially, upon location information from at least one sensor regarding at least one of:
a portion of the robot, and
the substrate carried by the robot.

6. A method as in claim 1 where the adjusting of movement of the robot is further based upon forward kinematics determination of the end effector which subsequently provides modified estimated end effector coordinates to the adaptive placement system to determine adjusted end effector coordinates to be used to drive at least one motor of the robot.

7. A method as in claim 1 where the adjusting movement of the robot comprises providing the estimated end effector coordinates to the adaptive placement system to determine adjusted end effector coordinates to be used to drive at least one motor of the robot.

8. A method as in claim 1 where the estimated end effector coordinates are provided to a robot location sensing system and/or to a substrate location sensing system, which subsequently provides modified estimated end effector coordinates to the adaptive placement system to determine adjusted end effector coordinates to be used to drive at least one motor of the robot.

9. An apparatus comprising:
at least one processor; and
at least one non-transitory memory including computer program code, the at least one memory and the computer program code configured to, with the at least one processor, cause the apparatus to:
calculate model end effector coordinates of an end effector of a robot when at least one sensor senses a substrate moving past the at least one sensor, where the substrate is on the end effector, and where an adaptive placement system is provided configured to use the sensing of the substrate by the at least one sensor and to use the calculated model end effector coordinates to control placing of the substrate at a desired position;
estimate deflection for at least one member of the robot during movement of the robot;
based at least partially upon the estimated deflection, determine estimated end effector coordinates for the end effector of the robot; and
generate at least one signal which is based at least partially upon the estimated end effector coordinates; and
adjust movement of the robot by the adaptive placement system based at least partially upon the at least one signal generated by the controller, the sensing of the substrate by the at least one sensor, and the calculated model end effector coordinates for placing the substrate at a desired location.

10. An apparatus as in claim 9 where the estimating of the deflection comprises a command transmission to at least one motor of the robot being used as an input to estimate the deflection, and where the command transmission comprises a command torque transmission which is transmitted to the at least one motor to generate a predetermined torque vector.

11. An apparatus as in claim 9 where the estimated deflection for the at least one member of the robot comprises at least one of:
a flexible frame member of a drive section of the robot,
a flexible drive shaft of the at least one motor,
a flexible link of an arm of the robot,
a flexible joint between links of the arm of the robot, and
an elastic belt or band of the arm of the robot.

12. An apparatus as in claim 9 where the estimating comprises at least one of:
estimation of flexibility effects using dynamic modeling,
estimation of flexibility effects using a state observer,
estimation of belt positioning error effects, and
direct measurement of flexibility effects using at least one auxiliary sensor.

13. An apparatus as in claim 9 where the estimating of the deflection is based, at least partially, upon location information from at least one sensor regarding at least one of:
a portion of the robot, and
the substrate carried by the robot.

14. An apparatus as in claim 9 where the adjusting of movement of the robot is further based upon forward kinematics determination of the end effector which subsequently provides modified estimated end effector coordinates to the adaptive placement system to determine adjusted end effector coordinates to be used to drive at least one motor of the robot.

15. An apparatus as in claim 9 where the adjusting of the movement of the robot comprises providing the estimated end effector coordinates to the adaptive placement system to determine adjusted end effector coordinates to be used to drive at least one motor of the robot.

16. An apparatus as in claim 9 where the estimated end effector coordinates are provided to a robot location sensing system and/or to a substrate location sensing system, which subsequently provides modified estimated end effector coordinates to the adaptive placement system to determine adjusted end effector coordinates to be used to drive at least one motor of the robot.

17. A non-transitory program storage device readable by a machine, tangibly embodying a program of instructions executable by the machine for performing operations, the operations comprising:
calculating model end effector coordinates of an end effector of a robot when at least one sensor senses a substrate, on the end effector, moving past the at least one sensor, where the operations are part of an adaptive placement system configured to use the sensing of the substrate by the at least one sensor and to use of the calculated model end effector coordinates to control placing of the substrate at a desired position;
estimating deflection for at least one member of the robot during movement of the robot;
based at least partially upon the estimated deflection, determining estimated end effector coordinates for the end effector of the robot;
generating at least one signal which is based at least partially upon the estimated end effector coordinates; and
adjusting movement of the robot by the adaptive placement system based at least partially upon the at least one signal generated by the machine, the sensing of the substrate by the at least one sensor, and the calculated model end effector coordinates for placing the substrate at a desired location.

18. A method as in claim 1 where the estimated end effector coordinates are different from the calculated model end effector coordinates.

\* \* \* \* \*